(12) United States Patent
Ballarin (10) Patent No.: US 9,475,453 B2
(45) Date of Patent: Oct. 25, 2016

(54) SEAT BELT ARRANGEMENT FOR A SUSPENSION SEAT AND VEHICLE EQUIPPED WITH SUCH AN ARRANGEMENT

(71) Applicant: VOLVO TRUCK CORPORATION, Göteborg (SE)

(72) Inventor: Paolo Ballarin, Saint Genis Laval (FR)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/442,564

(22) PCT Filed: Dec. 17, 2012

(86) PCT No.: PCT/IB2012/003049
§ 371 (c)(1),
(2) Date: May 13, 2015

(87) PCT Pub. No.: WO2014/096894
PCT Pub. Date: Jun. 26, 2014

(65) Prior Publication Data
US 2015/0367813 A1    Dec. 24, 2015

(51) Int. Cl.
*B60N 2/50* (2006.01)
*B60R 22/195* (2006.01)
*B60R 22/18* (2006.01)
*B60R 22/24* (2006.01)

(52) U.S. Cl.
CPC ............ *B60R 22/1958* (2013.01); *B60N 2/50* (2013.01); *B60R 22/18* (2013.01); *B60R 22/1954* (2013.01); *B60R 22/24* (2013.01); *B60N 2/502* (2013.01); *B60R 2022/1818* (2013.01); *B60R 2022/1957* (2013.01)

(58) Field of Classification Search
CPC ........ B60N 2/50; B60N 2/501; B60N 2/502; B60N 2/504; B60N 2/505; B60N 2/507; B60N 2/508; B60N 2/509; B60N 2/52; B60N 2/54; B60R 22/26; B60R 22/30; B60R 22/20; B60R 22/18
USPC .............. 280/801.1; 297/468, 483; 296/68.1, 296/65.02
See application file for complete search history.

(56) References Cited

U.S. PATENT DOCUMENTS

| | | | | |
|---|---|---|---|---|
| 4,033,594 A | * | 7/1977 | Lindblad | B60R 22/24 24/164 |
| 4,982,982 A | * | 1/1991 | Nishimura | B60R 22/022 280/808 |
| 5,015,010 A | * | 5/1991 | Homeier | B60N 2/00 280/808 |
| 5,020,856 A | * | 6/1991 | George | B60R 22/18 280/801.1 |
| 5,176,402 A | * | 1/1993 | Coulon | B60R 22/26 280/807 |
| 6,631,926 B2 | * | 10/2003 | Merrick | B60R 22/19 280/801.1 |
| 2002/0021041 A1 | * | 2/2002 | Jessup | B60N 2/4221 297/468 |
| 2008/0018088 A1 | * | 1/2008 | Gray | B60R 22/03 280/808 |

FOREIGN PATENT DOCUMENTS

| | | |
|---|---|---|
| GB | 1 554 307 A | 10/1979 |
| WO | 2004/103781 A1 | 12/2004 |

OTHER PUBLICATIONS

International Search Report (Sep. 10, 2013) for corresponding International App. PCT/IB2012/003049.

* cited by examiner

*Primary Examiner* — Keith Frisby
(74) *Attorney, Agent, or Firm* — WRB-IP LLP

(57) ABSTRACT

A seat belt arrangement includes a seat belt having a first end portion secured to the seat at a first lower attachment point, and a second end portion mounted on a reel secured to the vehicle frame; a lower deflection member slidably attached to the seat belt and equipped with a locking element intended to be removably locked in a second lower attachment point on the seat; an upper deflection system attached to the seat belt between the lower deflection member and the reel, and in which the seat belt may slide. The upper deflection system is arranged on a pivotal arm mounted on the vehicle frame so as to be able to automatically pivot about a pivot axis relative to the vehicle frame when the seat moves vertically, in order to keep the length of the torso portion of the seat belt, between the upper deflection system and the lower deflection member, and the seat belt tension substantially constant.

26 Claims, 7 Drawing Sheets

SEAT BELT ARRANGEMENT FOR A SUSPENSION SEAT AND VEHICLE EQUIPPED WITH SUCH AN ARRANGEMENT

BACKGROUND AND SUMMARY

The present invention relates to a seat belt arrangement for a suspension seat installed in a vehicle, as well as a vehicle equipped with such a seat belt arrangement.

Some vehicles, in particular commercial vehicles, are equipped with suspension seats which accommodate the vehicle movements, therefore preventing health problems such us back pain for the seat occupant.

Like other types of seat, suspension seats are equipped with a seat belt arrangement including a seat belt which is designed to secure the seat occupant against harmful movement that may result during a collision or a sudden stop. A seat belt arrangement typically comprises a seat belt an end of which is mounted on a reel. The seat belt is attached on the seat by a first lower attachment point and by a lower deflection member removably locked in a second lower attachment point. An upper deflection point is further provided between the lower deflection member and the reel.

The structure, behaviour and use of a suspension seat being different from those of a fixed seat, specific and adapted features have been developed for the seat belt arrangements of suspension seats. However, the conventional seat belt arrangements for suspension seats are not fully satisfactory.

One first type of seat belt arrangement for a suspension seat provides for installing all components of the arrangement on the suspension seat, including the reel. This considerably increases the seat weight. This weight is further increased because the seat itself has to withstand the stresses in case of a sudden deceleration and therefore has to include the appropriate structural elements for that purpose. As a result, the seat cost is higher and its transportation is more complicated.

In order to save weight, one second type of seat belt arrangement for a suspension seat provides for installing part of the components of the arrangement on the vehicle frame, typically the reel and the upper deflection point. However, as the seat moves vertically with respect to the vehicle frame while the upper deflection point remains fixedly secured on the vehicle frame, the torso portion of the seat belt, between the upper deflection point and the lower deflection member, is not always adequately positioned relative to the seat, i.e. relative to the seat occupant. The latter may then experience discomfort, in particular due to continuous friction of the seat belt over his torso and cutting effect on his neck or face. The occupant's safety might even not been perfectly ensured in case the seat belt position is greatly offset from its appropriate position.

It therefore appears that from several standpoints, there is room for improvement in seat belt arrangements for suspension seats.

It is desirable to provide an improved seat belt arrangement for a suspension seat which can overcome the drawbacks of the prior art.

More particularly, it is desirable to provide a seat belt arrangement for a suspension seat installed in a vehicle which makes it possible to simplify the seat structure while ensuring the comfort and safety of the seat occupant.

According to a first aspect, the invention relates to a seat belt arrangement for a suspension seat installed in a vehicle, the suspension seat being capable of moving vertically relative to the vehicle frame in response to the vehicle movements, the seat belt arrangement comprising:
a seat belt having a first end portion intended to be secured to the seat at a first lower attachment point, and a second end portion mourned on a reel intended to be secured to the vehicle frame;
a lower deflection member slidably attached to the seat belt between said first end portion and said second end portion and equipped with a locking element intended to be removably locked in a second lower attachment point on the seat so that, when the lower deflection member is locked in said second lower attachment point, the direction of the seat belt is modified by the lower deflection member;
an upper deflection system to deviate the seat belt between the lower deflection member and the reel, and in or on which the seat belt may slide;
a pivotable arm in or on which the upper deflection system is arranged and which is intended to be mounted on the vehicle frame so as to be able to automatically pivot about a pivot axis relative to the vehicle frame when the seat moves vertically, in order to keep the length of the torso portion of the seat belt, between the upper deflection system and the lower deflection member, substantially constant.

Thus, on the one hand, owing to the fact that the reel is intended, to be secured to the vehicle frame, the seat overall weight is decreased. Furthermore, as the upper deflection system is also attached to the vehicle frame, by means of the pivotable arm, the invention makes it possible to relieve strain from the seat, since the strains due to a strong deceleration or even a collision can be taken up by the vehicle frame. This further allows a decreasing of the seat weight.

On the other hand, positioning these components of the seat belt arrangement on the vehicle frame is not done to the detriment of comfort nor safety. Indeed, because the length of the torso portion of the seat belt is kept substantially constant and the variations of the seat belt tension are reduced by means of the pivotable arm, the seat belt is continuously properly maintained over the seat occupant's torso, despite the fact that the seat moves vertically while the upper deflection system is mounted on the vehicle frame.

In practice, the length of the torso portion of the seat belt remains substantially unchanged. Of course, a slight length variation, for example not exceeding 5%, may occur the torso portion, provided this variation does not substantially impair the occupant's comfort and safety.

In other words, the invention makes it possible to keep the height of the upper deflection system relative to the seat substantially constant. It has to be noted that this correspond to a continuous adjustment, i.e. an adjustment in permanent mode, and not an initial adjustment that the seat occupant makes once for putting, the upper deflection system at the appropriate height according to his morphology.

In practice, the pivotable arm includes a body and the upper deflection system which is attached to the body. The upper deflection system can either be fixedly attached to the body or include at least one part movable with respect to the body. The pivotable arm can be substantially rigid and non deformable, and capable of pivoting about the pivot axis. Alternatively, at least part of the pivotable arm body can be made of a semi rigid material capable of undergoing an elastic deformation corresponding to a pivoting movement of the upper deflection system relative to the pivot axis.

The seat belt arrangement may also comprise elastic return means arranged to urge the pivotable arm towards a predetermined neutral position, the return force of said elastic return means being set to compensate the pulling force exerted on the pivotable arm when the seat moves vertically, in order to keep the length of the torso portion of the seat belt and the seat belt tension substantially constant.

In an advantageous embodiment, the upper deflection system is arranged on a front end of the pivotable arm, the pivot axis being offset rearward from the upper deflection system, in the mounted position, i.e. when the seat belt arrangement is mounted on a seat in the vehicle. Thus, the pivoting of the pivotable arm results in the upper deflection system being lowered or raised relative to the seat.

The term "front end of the pivotable arm" refers to an end of the pivotable arm that extends towards the front of the vehicle when the seat belt arrangement is mounted with a suspension seat in the vehicle.

The term "offset rearward" refers to a direction that extends from the front to the rear of the vehicle when the seat belt arrangement is mounted with a suspension seat in the vehicle.

Moreover, this disposition makes the seat belt easier to grab as compared to conventional suspension seats having a seat belt which in nominal position lies flat on the backrest. Indeed, owing to the invention, the upper deflection system can be located forward with respect to the seat backrest.

In a preferred embodiment, the pivotable arm comprises braking means capable of restraining or blocking the movement of the seat belt relative to the upper deflection system when the seat moves vertically. These braking means may be arranged on various parts of the pivotable arm, typically on a body of the pivotable arm or on the upper deflection system which is mounted on said body of the pivotable arm. Advantageously, these are self braking means, i.e. means that are activated automatically and without the implementation of another component, when there is a need to limit the movement of the seat belt relative to the upper deflection system.

The braking means may comprise friction means designed to cooperate with the seat belt so as to substantially prevent the seat belt from sliding relative to said upper deflection system in normal operation and when the seat is moving vertically, and to allow the seat belt to slide relative to said upper deflection system following a manual traction by a user. Preferably the friction means are designed such that the friction force generated between the friction means and the seat belt is greater than the seat belt tensile force that causes the rotation of the pivotable arm about said pivot axis.

In other words, in this implementation, the seat belt arrangement makes it possible to keep the length of the torso portion of the seat belt substantially constant and to reduce the variations in the seat belt tension through friction means which are arranged on the upper deflection system, and which are the means allowing the seat belt to make the arm pivot in normal operation. These features also prevent the seat belt from being too loose or too tight on the seat occupant's torso.

The braking means are constituted by or include the friction means, and are preferably arranged on the upper deflection system.

With this implementation, there is no need for a mechanical link between the seat and the upper deflection system—for example between the seat and the pivoting arm—in order to cause an automatic movement of the pivotable arm in response to a seat movement. The seat belt arrangement is therefore less complicated and more robust. However, providing such a mechanical link would be a possible alternative technical solution.

"In normal operation" means in steady state, i.e. when an occupant is sat on said suspension seat and has fastened his seat belt. Then, in order for the seat belt arrangement to work adequately, the friction means prevent the belt from sliding relative to the upper deflection system both when the suspension seat moves downward and upward. The manual traction exerted by a user corresponds to a transient state, when the user, i.e. the seat occupant, pulls the seat belt in order to put it on. During this transient state, the sliding of the belt relative to the upper deflection system can be allowed for example because the force exerted on said seat belt is higher and/or because the orientation of the seat belt is different from its orientation in normal operation, resulting in a lower level of friction on the upper deflection system.

For example, the friction means can comprise an anti slip surface, including an anti slip material and/or relief patterns.

In an embodiment, the braking means can comprise at least one movable member which can move with respect to a body of the pivotable arm between a blocking position, in which the seat belt cannot slide relative to said upper deflection system in normal operation, and a release position, in which the seat belt can slide relative to said upper deflection system. Preferably, the movable member can be in the release position only when a user pulls on the seat belt. In said release position, the friction level is lower, typically because the contact area is smaller. This can be achieved for example because the seat belt has been partly moved away from a contact area, or because the shape of the contact area has been changed.

The seat belt arrangement may comprise a spring member designed to stress said movable member towards its release position, the movable member being able to be moved towards the blocking position, against the spring force, by the seat belt in normal operation.

Alternatively, the seat belt arrangement may comprise a spring member designed to stress said movable member towards its blocking position, the movable member being able to be moved towards the release position, against the spring force, through a manual action of a user pulling on the seat belt.

In another embodiment, the upper deflection system can be fixed with respect to a body of the pivotable arm and can comprise a bearing surface for the seat belt which is at least partially substantially cylindrical in shape, said friction means being arranged on said bearing surface.

The whole bearing surface can then be covered with an anti slip surface.

It may be envisaged that the bearing surface includes a retractable flap which is maintained substantially level with the remaining portion of the bearing surface in normal operation and which protrudes outward when a user pulls on the seat belt. An anti slip surface may cover at least part of the retractable flap and/or at least part of the remaining portion of the bearing surface.

In an implementation of the invention, the upper deflection system can comprise a plurality of rolls capable of forming a winding path for the seat belt, thereby braking the movement of the seat belt relative the upper deflection system.

For example, at least one roll is movable relative to the other roll(s) between a first position in which the path is designed to generate a first level of friction, which is sufficient to cause braking, and a second position, in which said roll is located farther from the other roll(s), so that the path is less winding and generates a second level of friction which is lower than the first one.

It may be envisaged that the upper deflection system comprises at least one roll rotatably mounted on a body of the pivotable arm and having friction means arranged on its outer surface, the braking means being arranged to hinder the free rotation of said roll with respect to the pivotable arm body.

Besides, the pivotable arm is preferably designed to be collapsible towards a security configuration, in which its front end has moved rearward and/or upward, in case the vehicle is subjected to a shock or to an deceleration exceeding a predetermined level. This can typically happen in case the vehicle suddenly brakes or stops, for example during a collision.

Owing to this feature, the pivotable arm does not affect safety in case of an accident, since there is no risk for the seat occupant to hit the pivotable arm insofar has it has moved away from the occupant. Another advantage of this disposition is that it further entails a pretension of the seat belt, ensuring the seat occupant is maintained against the backrest.

In practice, the pivotable arm can be made of a material capable of being elastically deformed towards a security configuration in case of a collision. Alternatively, the pivotable arm can be substantially rigid, means being then provided to move it towards the security configuration.

The seat belt arrangement can comprise a safety actuator coupled to a sensor capable of detecting a strong deceleration of the vehicle or capable of detecting a shock on the vehicle, for example due to a collision with another vehicle or with a static obstacle, the safety actuator being capable of quickly pivoting the pivotable arm. The term "quickly" means that the pivoting movement is provoked sufficiently fast to avoid the seat occupant, who also undergoes an unintentional displacement due to the strong deceleration, hitting said pivotable arm.

The sensor can comprise a shock detector or an accelerometer, while the safety actuator can comprise an electromagnetic device or a pyrotechnic device for example.

In an embodiment, the safety actuator can include:
elastic, return means capable of urging the pivotable arm towards the neutral position;
a retaining element which cooperates with the elastic return means in normal operation in order to prevent them from stressing the pivotable arm beyond the neutral position;
a deactivating element capable of deactivating the retaining element so that the elastic return means can move the pivotable arm beyond the neutral position towards the security configuration.

In another embodiment, the safety actuator can be distinct from said elastic return means, said safety actuator, that can be an electromagnetic device or a pyrotechnic device, being designed not to hinder the normal operation of the elastic return means and, following a shock or an deceleration exceeding a predetermined level, to cause the pivotable arm to pivot despite or in addition to the elastic return means. Depending on the configuration of the seat belt arrangement, the safety actuator can be designed to overcome the force of said elastic return means or, on the contrary, to supplement said force.

According to a second aspect, the invention relates to a vehicle comprising:
a frame;
a suspension seat installed so as to be capable of moving vertically relative to the vehicle frame in response to the vehicle movements, the suspension seat including a first and a second lower attachment points;
and a seat belt arrangement as previously described, the seat belt first end portion being secured to the seat at the first lower attachment point, the reel on which the seat belt second end is mounted being secured to the vehicle frame, and the pivotable arm being pivotably mounted on the vehicle frame about a pivot axis.

For example, the pivot axis is substantially transversal to the vehicle and offset rearward from the upper deflection system.

Advantageously, the upper deflection system can be located forward from the seat backrest. By providing a gap between the seat backrest and the seat belt, the invention allows the seat belt to be easier to grab. Since the user does not need to catch the seat belt behind his shoulder and does not experience difficulties in grabbing it, he is more likely to use it, even if he has to make this gesture several times a day, like distribution drivers.

Furthermore, in an implementation, the pivot axis position on the vehicle can be adjusted longitudinally and/or vertically. This makes it possible to adapt the seat belt arrangement to the seat occupant's morphology. It has to be noted that this adjustment has to be made one and for all by a specific user, and has nothing to do with the continuous and automatic movement of the pivotable arm following the vertical movements of the seat during normal operation.

Typically, the pivot axis can be arranged on the vehicle B-pillar. These and other features and advantages will become apparent upon reading the following description in view of the drawing attached hereto representing, as non-limiting examples, embodiments of a vehicle according to the invention.

BRIEF DESCRIPTION OF THE DRAWINGS

The following detailed description of an embodiment of the invention is better understood when read in conjunction with the appended drawings, it being however understood that the invention is not limited to the specific embodiment disclosed.

FIGS. 7 to 9b show variants of the upper deflection system of FIG. 5 as well as its operation in normal mode or when a user pulls the seat belt;

FIGS. 11 to 12b show a variant of the system of FIG. 10, as well as its operation in normal mode or when a user pulls the seat belt;

DETAILED DESCRIPTION

Figure 1:
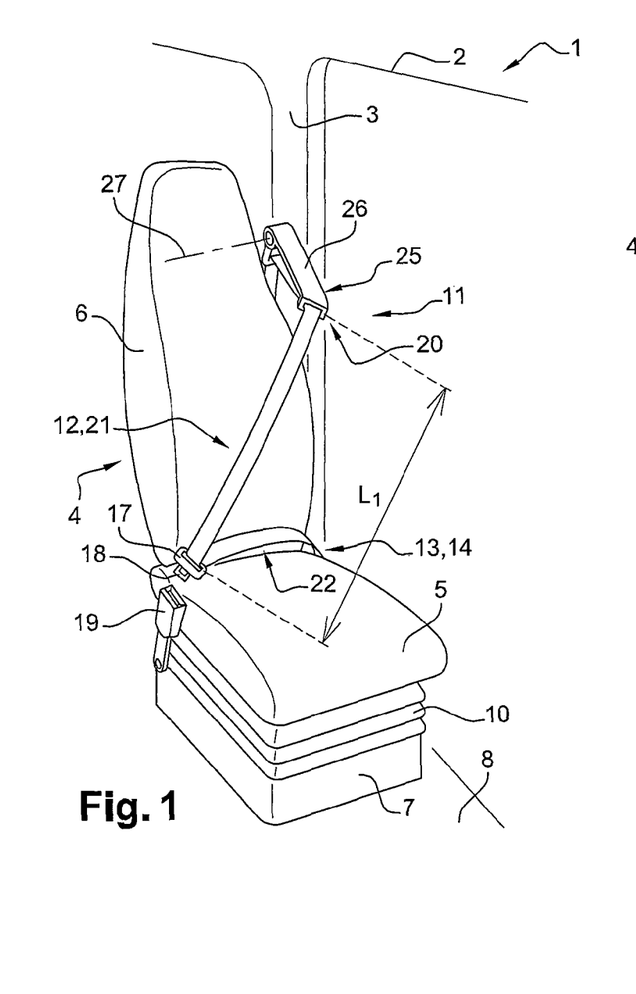
FIGS. 1 and 2 show a seat installed in a vehicle and equipped with a seat belt arrangement according to the invention, respectively in perspective and viewed from one side.
Figure 2:
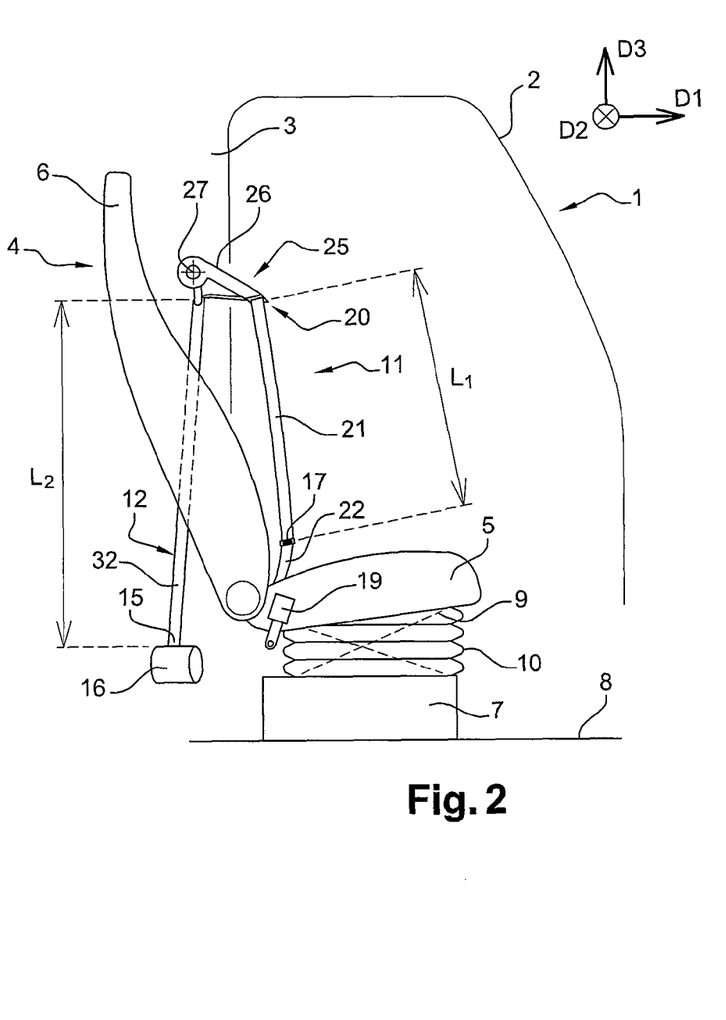

Partially illustrated in FIGS. 1 and 2 is a vehicle 1 which can typically be a commercial of industrial vehicle, such as a van or a truck. The vehicle 1 comprises to frame 2 including a B-pillar 3.

On the vehicle 1 is installed a suspension seat 4, which comprises a sitting portion 5 and a backrest 6. The seat 4 is mourned on a base 7 secured to the vehicle floor by means of a mechanism 9 allowing the seat 4 to move vertically relative to the vehicle frame 2 in response to the vehicle movements. The mechanism 9 can be located inside a flexible protective housing forming a bellows 10.

The vehicle 1 further comprises a seat belt arrangement 11 comprising a seat belt 12.

The seat belt 12 has a first end portion 13 which, in the mounted position, is secured to the seat 4 at a first lower attachment point 14 and a second end portion 15 mounted on a reel 16 secured to the vehicle frame 2. More precisely, the first lower attachment point 14 is fixedly attached to a first side of the sitting portion 5.

A lower deflection member 17 slidably attached to the seat belt 12, between the first and the second end portions 13, 15 of the seat belt 12, is equipped with a locking element 18 such as a buckle intended to be removably locked in a second lower attachment point 19 on the seat 4. More precisely, the second lower attachment point 19 is fixedly attached to a side of the sitting portion 5 opposite the first lower attachment point 14. When the lower deflection member 17 is locked in the second lower attachment point 19, it changes the direction of the seat belt 12.

Moreover, an upper deflection system 20 is connected to the seat belt 12 between the lower deflection member 17 and the reel 16. The upper deflection system 20 allows the direction of the seat belt 12 to be changed between the lower deflection member 17 and the reel 16. The seat belt 12 is capable of sliding relative to said upper deflection system 20.

On the seat belt 12 is thus defined:
a torso portion 21 between the upper deflection system 20 and the lower deflection member 17;
and a lap portion 22 between the lower deflection member 17 and the first lower attachment point 14.

The seat belt arrangement 11 further comprises a pivotable arm 25 which comprises a body 26 and the upper deflection system 20 mounted on the body 26. The pivotable arm 25 is pivotably mounted on the vehicle frame 2 about a pivot axis 27.

In the illustrated embodiments, the pivot axis 27 is arranged on the vehicle B-pillar 3, near one side of the backrest 6 of the seat 4, and is substantially transversal to the vehicle 1, i.e. oriented according to the transversal direction D2 shown in FIG. 2. It may be envisaged that the pivot axis position on the vehicle 1 can be adjusted longitudinally (according to the longitudinal direction D1) and/or vertically (according to the vertical direction D3), so that the seat belt 12 be adapted to the morphology of the seat occupant, for example the driver of the vehicle 1.

In an embodiment, the upper deflection system 20 is arranged on a front end of the pivotable arm 25, and the pivot axis 27 is offset rearward from the upper deflection system 20. In other words, the upper deflection system 20 is located forward from the seat backrest 6.

According to an important feature of the invention, the seat belt arrangement 12 is designed so that the pivotable arm 25 is able to automatically pivot about the pivot axis 27, relative to the vehicle frame 2, when the seat 4 moves vertically. As a result, the length of the torso portion 21 of the seat belt 12 and the seat belt tension can be kept substantially constant.

In practice, once a user has sat on the seat 4 and has put the seat belt 12 on, the seat 4 substantially continually moves vertically upward or downward following the movements of the vehicle 1 in motion. Owing to the seat belt arrangement 12 according to the invention, the position of the upper deflection system 20 with respect to the vehicle frame 2 is automatically adjusted by a pivoting movement of the pivotable arm 25 in the appropriate direction, resulting in lowering or raising the front end of said pivotable arm 25. As a consequence, the height of the upper deflection system 20 relative to the sitting portion 5 of the seat 4 is kept substantially constant, thereby ensuring that the torso portion 21 of the seat belt 12 is always adequately positioned relative to the seat occupant, for improving comfort and security.

The seat belt arrangement 12 can further comprise elastic return means, such as a torsion spring 28 (see FIG. 4), arranged to urge the pivotable arm 25 towards a predetermined neutral position. The return force of said elastic return means 28 are set to compensate for the pulling force exerted on the pivotable arm 25 when the seat 4 moves vertically, in order to keep the length of the torso portion 21 of the seat belt 12 substantially constant and to reduce the variations of the seat belt tension on the torso portion 21.

Figure 3A:
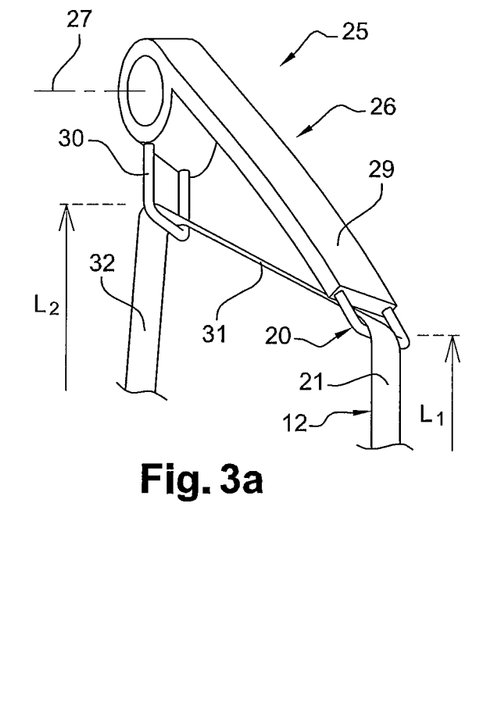
FIGS. 3a and 3b are detailed views of the pivotable arm of the seat belt arrangement of FIG. 1, respectively in a neutral position and after it has pivoted.
Figure 3B:
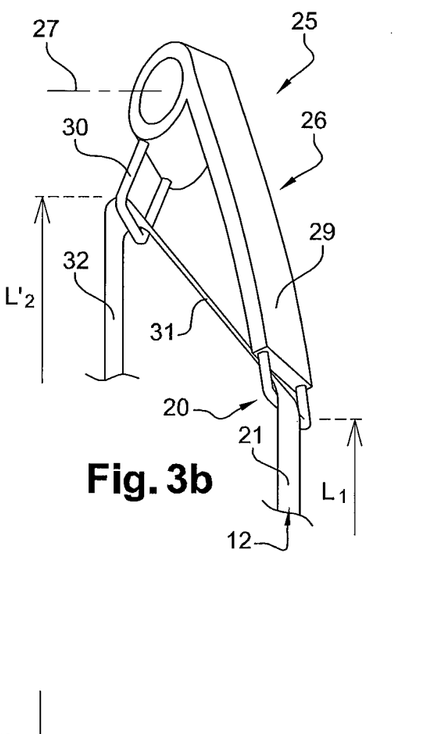

FIGS. 3a and 3b show an embodiment of a pivotable arm 25 respectively in a neutral position and after it has pivoted downward about pivot axis 27, following a downward vertical movement of the seat 4. In this embodiment, the body 26 of the pivotable arm 25 comprises a front leg 29 at the front end of which is mounted the upper deflection system 20. The body 26 of the pivotable arm 25 also comprises a rear leg 30 including an additional deflection member in which the seat belt 12 may slide. Therefore, in this embodiment, the seat belt 12 comprises an intermediate portion 31 between the torso portion 21 and the return portion 32 located between the pivotable arm 25 and the reel 16, said intermediate portion 31 being for example substantially horizontal in the neutral position, as shown on FIGS. 2 and 3a.

FIGS. 3a and 3b schematically indicate that the length L1 of the torso portion 21 of the seat belt 12 remains substantially constant owing to the pivoting movement of the pivotable arm 25 about axis 27, while the length of the return portion 32 of the seat belt 2 may change from L2 to L'2 depending of the design of the pivotable arm 25. In a variant of this embodiment, the additional deflecting is designed and arranged near and around the pivot axis 27 so that the length L2 of the return portion 32 remains substantially constant when the pivotable arm 25 is around the pivot axis 27.

Figure 4:
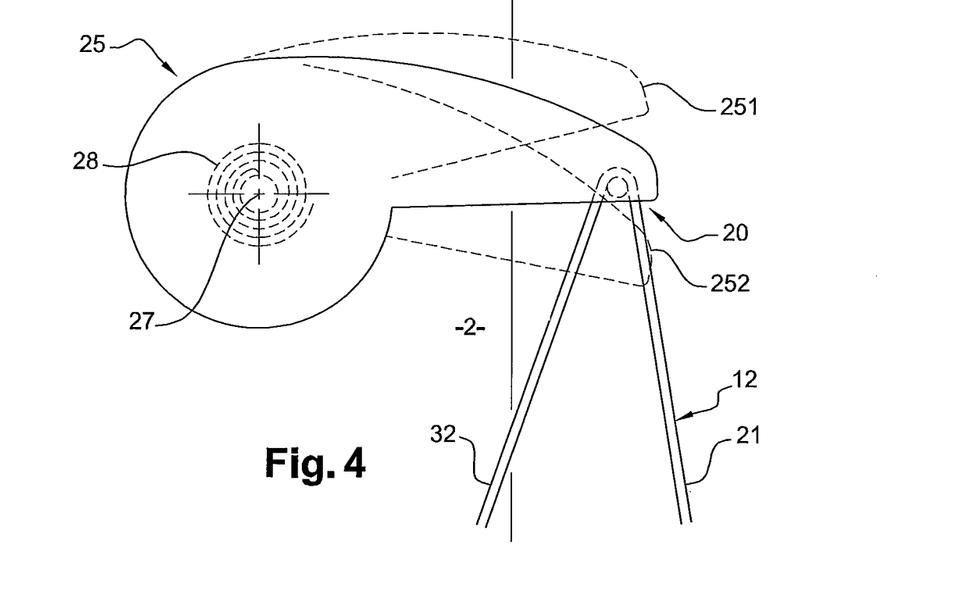
FIG. 4 is a schematic view of an alternative embodiment of a pivotable arm.

FIG. 4 shows another embodiment of a pivotable arm 25 comprising a single leg, the seat belt 12 therefore comprising no intermediate portion between the torso portion 21 and the return portion 32. The solid line illustrates the pivotable arm 25 in the neutral position, while the dotted lines 251, 252 illustrate two possible positions of the pivotable arm 25 after it has pivoted, either upward 251 or downward 252, depending on the seat movements.

According to some other implementations of the invention, the pivotable arm 25 may comprise braking means 35 capable of restraining, or even blocking the movement of the seat belt 12 relative to the upper deflection system 20 when the seat 4 moves vertically. These braking means 35, such as for instance represented on FIGS. 5 to 12, thus constitute or form part of the means that cause the pivotable arm 25 to automatically pivot when the seat 4 moves vertically.

In other words, when the seat 4 moves downward, a traction is exerted by the second lower attachment point 19 on the torso portion 21 of the seat belt 12. Insofar as the seat belt 12 is prevented from sliding relative to the upper deflection system 20, this results in a lowering of the front end of the pivotable arm 25 by the pivoting movement of said pivotable arm 25 about pivot axis 27. On the contrary, when the seat 4 moves upward, this tends to make the seat belt 12 looser. The elastic return means 28 causes then movement of the pivotable arm 25 about pivot axis 27 on the opposite direction. This results in a raising of the front end of the pivotable arm 25.

If the seat belt arrangement 12 is not equipped with elastic return means 28, a particular design of the pivotable arm 25 can allow that it is the reel 16, pulling on the seat belt 12 and because the seat belt 12 is prevented from sliding relative to the upper deflection system 20, that causes a raising of the front end of the pivotable arm 25 by the pivoting movement of said pivotable arm 25 about pivot axis 27 on the opposite direction.

Figure 15:
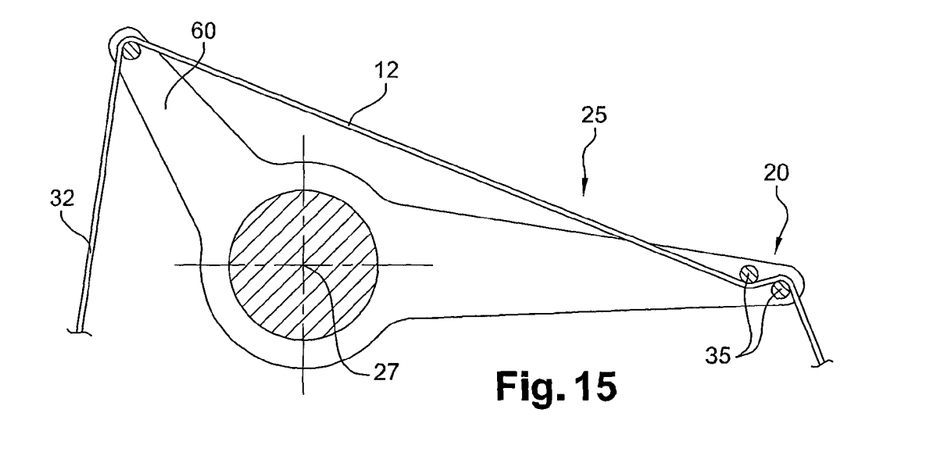
FIG. 15 is a detailed view of a further embodiment of a pivotable arm.

A particular design of the pivotable arm 25 can be based on a specific arrangement of an additional deflecting member, between the upper deflection system 20 and the reel 16, that is for instance, part of the pivotable arm 25 and that is arranged upward and rearward with respect to the pivot axis. Such an arrangement is depicted in FIG. 15 where the pivotable arm 25 comprises a rear top leg 60 including the additional deflection member.

Reference is now made to FIGS. 5 to 9b which illustrate several variants of a first embodiment of the upper deflection system 20 according to the invention.

In this embodiment, the braking means 35 comprise friction means arranged on the upper deflection system 20 and designed to cooperate with the seat belt 12. The friction means makes it possible to substantially prevent the seat belt 12 from sliding relative to said upper deflection system 20 in normal operation, while allowing the seat belt 12 to slide relative to said upper deflection system 20 following a manual traction by a user. Said friction means may typically comprise an anti slip surface 38, including an anti slip material and/or relief patterns.

Figure 5:
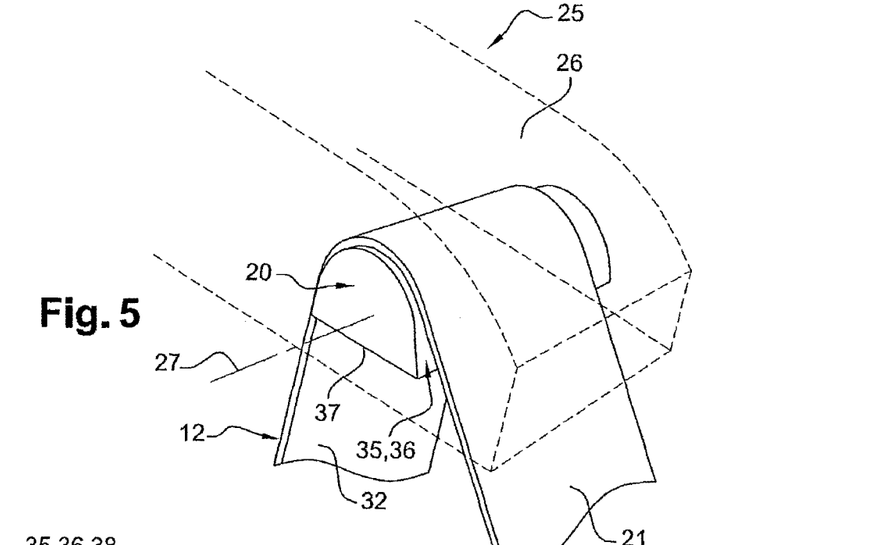
FIG. 5 is a detailed view of an upper deflection system for the seat belt arranged on the pivotable arm, provided with braking means according to a first embodiment.

As shown in FIG. 5, the upper deflection system 20 is fixed with respect to the body 26 of the pivotable arm 25. The upper deflection system 20 comprises a bearing surface 36 for the seat belt 12, which is at least partially substantially cylindrical in shape. For example, the upper deflection system 20 is semi cylindrical, with the flat portion 37 being substantially horizontal, in the neutral position and facing downward, and the bearing surface 36 including the friction means.

Figure 6A:
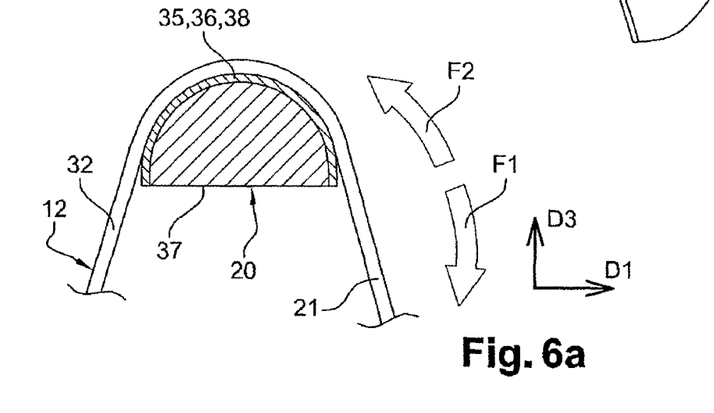
FIGS. 6a and 6b show the operation of the braking means of FIG. 5 respectively in the normal mode and when a user pulls the seat belt.
Figure 6B:
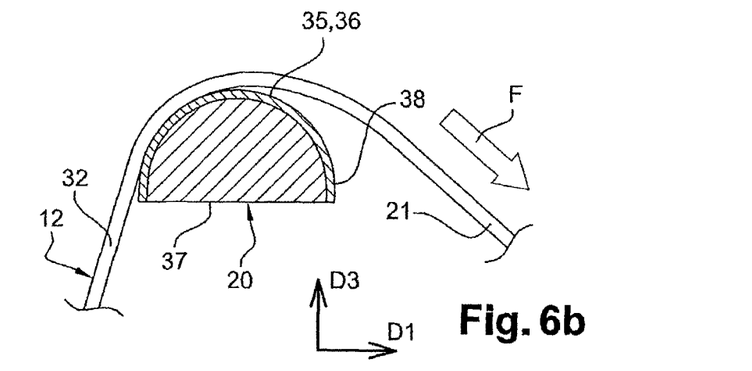
Figure 7:
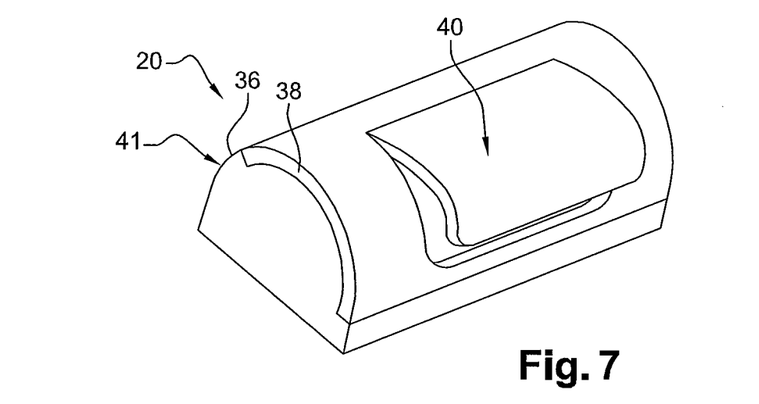

In the variants shown in FIGS. 6a and 6b, substantially the whole bearing surface 36 is covered with an anti slip surface 38.

In normal operation, as shown in FIG. 6a, the seat belt 12 is substantially pressed against the bearing surface 36 by its tension, thereby being in contact with the anti slip surface 38. As a consequence, a sliding movement of the seat belt 12 relative to the upper deflection system 20, either downward (according to arrow F1) or upward (according to arrow F2) is prevented under normal conditions.

On the contrary, such a sliding movement of the seat belt 12 relative to the upper deflection system 20 is possible when a user pulls the seat belt 12, as shown in FIG. 6b, indeed, for putting, the seat belt 12 on, a seat occupant pulls said seat belt 12 forward and above his shoulder according to a direction illustrated by arrow F which is not as inclined downward as arrow F1. As a consequence, the area of the bearing surface 36—and more specifically the anti slip surface 38—which is in contact with the seat belt 12 is lower. The force exerted by the user may also be higher than the force exerted on the seat belt 12 in normal operation when the seat 4 moves vertically. Therefore, the friction force between the seat belt 12 and the upper deflection system 20 is lower, and the relative sliding movement is made possible.

In the variants shown in FIGS. 7 to 9b, the bearing surface 36 includes a retractable flap 40 which is maintained substantially level with the remaining portion 41 of the bearing surface 36 in normal operation and which protrudes outward when a user pulls on the seat belt 12. In practice, a spring member (not shown) may be designed to stress said flap 40 towards its protruding position, and the flap 40 can be moved towards the remaining portion 41 of the bearing surface 36, in a stowed position, against the spring force, by the seat belt 12 in normal operation. Alternatively and instead of providing a spring member, the flap ma be designed to generate by itself a spring force that tends to move towards the remaining portion 41. The flap 40 is preferably located at the front part of the bearing surface 36.

Figure 8A:
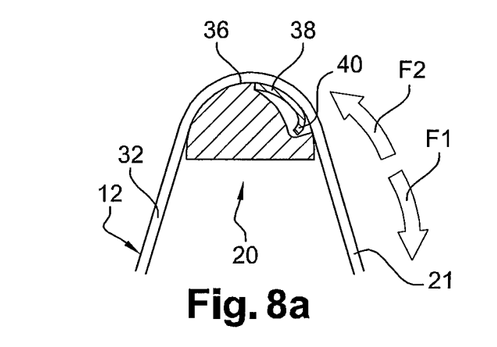
Figures 8B, 9B:
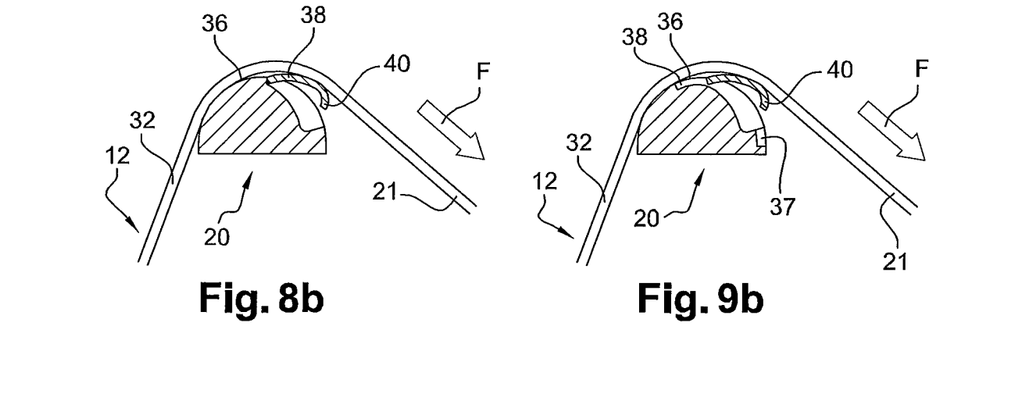
Figure 9A:
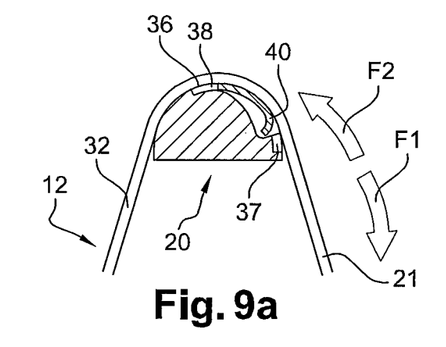

An anti slip surface 38 can cover at least pan of the retractable flap 40, as shown in FIGS. 8a and 8b, or at least part of the remaining portion 41 of the bearing surface 36, as shown in FIGS. 9a and 9b. The anti slip surface 38 can also cover both, i.e. at least part of the retractable flap 40 and at least part of the remaining portion 41 of the bearing surface 36.

In normal operation, as shown in FIGS. 8a and 9a, the seat belt 12 is substantially pressed against the bearing surface 36 by its tension. Thus, the seat belt 12 urges the flap 40 towards its stowed position, corresponding to a blocking position in which the seat belt 12 is braked and cannot slide relative to the upper deflection system 20. Indeed, the seat belt 12 being in contact with the anti slip surface 38, it cannot slide either downward (according to arrow F1) or upward (according to arrow F2) under normal conditions.

When a user pulls the seat belt 2, as shown in FIGS. 8b and 9b, the torso portion 21 of the seat belt 12 is oriented according to arrow F, as previously explained. As a result, the seat belt 12 no more presses the flap 40, and due to a spring force, generated for instance by a spring member, said flap 40 is in its protruding position, corresponding to a release position in which the seat belt 12 can slide relative to the upper deflection system 20. Indeed, the area of the anti slip surface 38 which is in contact with the seat belt 12 is lower than in normal operation, as can be seen from FIGS. 8a to 9b, the friction force being thus lower too.

Reference is now made to FIGS. 10 to 12b which illustrate several variants of a second embodiment of the upper deflection system 20 according to the invention.

In this second embodiment, the upper deflection system 20 comprises a plurality of mils 41 capable of forming a winding path for the seat belt 12, thereby braking the movement of the seat belt 12 relative the upper deflection system 20.

Figure 10:
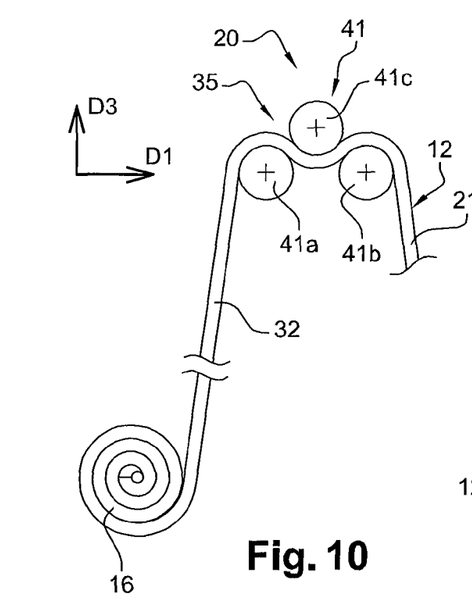
FIG. 10 is a detailed view of an upper deflection system for the seat belt arranged on the pivotable arm, provided with braking means according to a second embodiment.

In the variant illustrated in FIG. 10, there are provided three rolls having substantially parallel axes, namely two lower rolls 41a, 41b and one upper roll 4c located above the lower rolls 41a, 41b according to direction D3 and between the lower rolls 41a, 41b according to direction D1.

As a result, the braking effect is obtained by the winding path which the seat belt 12 is forced to follow between the rolls 41. The respective positions of axes have to be set depending on the rolls diameter to ensure an appropriate braking effect, and to allow the user to pull the seat belt 12 in order to put it on, with a higher though reasonable effort.

For the upper deflection system 20 to prevent the seat belt 12 from sliding on the rolls 41, several implementations can be envisaged. In particular, one or all rolls 41 can be fixedly attached to the pivotable arm body 26, with no possible rotating movement about their respective axes. Additionally or alternatively, friction means could be arranged on part or all of the surfaces in contact with the seat belt 12.

Figure 11:
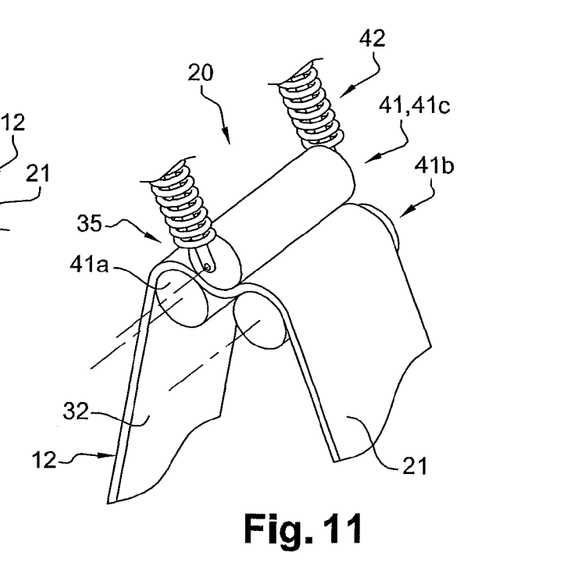
Figures 12A, 12B:
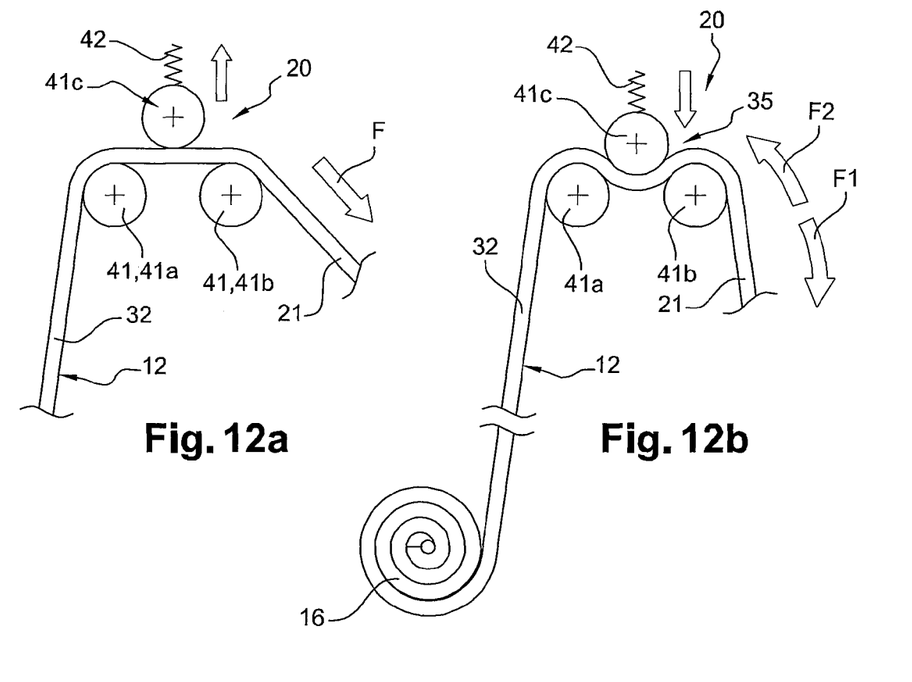

In the variant illustrated in FIGS. 11 to 12b, one of the rolls, here the upper roll 41c, is movable relative to the other rolls 41a, 41b between a first position (see FIG. 12b), in which the path is designed to generate a first level of friction, and a second position (see FIG. 12a), in which said roll 41c is located farther from the other rolls 41a, 41b, so that the path is less winding and venerates a second level of friction which is lower than the first one.

Thus, the first position corresponds to a blocking position, in which the seat belt 12 cannot slide relative to the upper deflection system 20 in normal operation, and the second position corresponds to a release position, in which the seat belt 12 can slide relative to the upper deflection system 20.

In practice, the lower rolls 41a, 41b can be fixedly attached to the pivotable arm body 26 while the upper roll 41c can be movable with respect to said body 26.

Preferably, a spring member 42 can be designed to stress the upper roll 41c towards its blocking position, the upper roll 41c being able to be moved towards the release position, against the spring force, through a manual action of a user pulling on the seat belt 12. Indeed, when a user pulls the seat belt 12, the portion of the seat belt 12 located between the lower rolls 41a, 41b becomes substantially stretched tight, therefore exerting a force causing the upper roll 41c to move upward despite the spring member 42, as shown on FIG. 12a.

Here the braking, effect is achieved by the winding path between the rolls 41 and, in addition by the force of the spring member 42. It is also possible to provide friction means arranged on the upper deflection system 20 and designed to cooperate with the seat belt 12 as previously described. Part or all of the bearing surface can be covered with an anti slip surface, including an anti slip material and/or relief patterns.

According to an advantageous implementation of the invention, the pivotable arm 25 is designed to be collapsible towards a security configuration, in which its front end has moved rearward and/or upward, in case the vehicle 1 is subjected to a shock or a deceleration exceeding a predetermined level.

To that end, in practice, the seat belt arrangement 11 can comprise a safety actuator 45 coupled to a sensor 49 capable of detecting a strong deceleration of the vehicle 1 or a shock on the vehicle caused for instance by a collision, the safety actuator 45 being capable of quickly pivoting the pivotable arm 25.

Figures 13A, 13B:
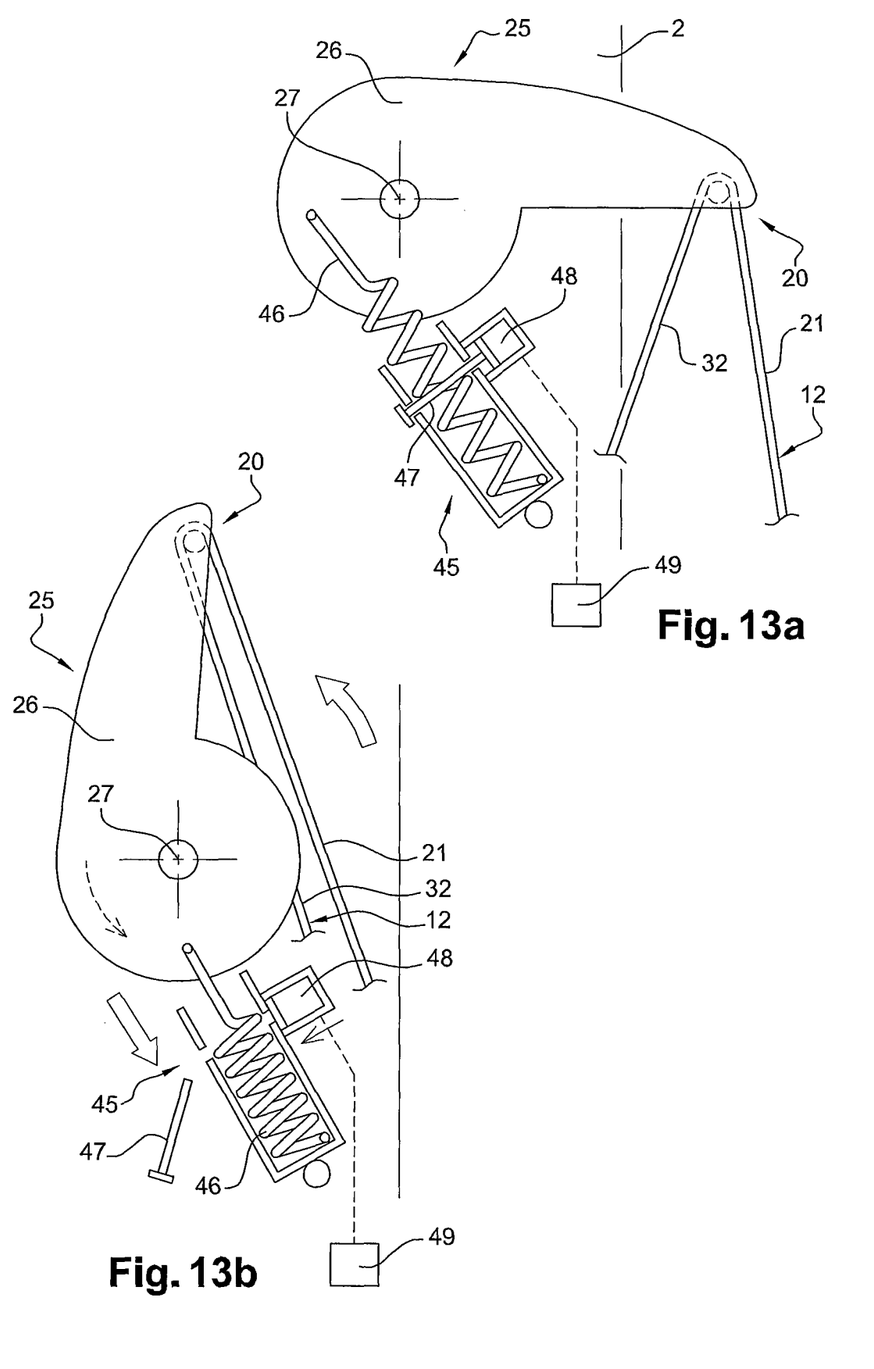
FIGS. 13a and 13b are detailed views of a pivotable arm of a seat belt arrangement, provided with means allowing said arm to be collapsible, according to a first embodiment, respectively during normal use and after a strong deceleration of the vehicle.

According to a first embodiment, depicted in FIGS. 13a and 13b, the safety actuator 45 includes elastic return means 46 which are arranged to urge the pivotable arm 25 towards the neutral position. Said elastic return means 46 can be provided in addition to the torsion previously mentioned spring 28. Moreover, the safety actuator 45 includes a retaining element 47 which here is a pin, which cooperates with the elastic return means 46 in normal operation in order to prevent them from stressing the pivotable arm 25 beyond the neutral position. A deactivating element 48 is further provided for deactivating the retaining element 47, so that the elastic return means 46 can move the pivotable arm 25 beyond the neutral position towards the security configuration.

In practice, the elastic return means 46 can be a tension spring urging the pivotable arm 25 towards its security configuration, but restrained by pin 47. The deactivating element 48 can be an electromagnetic device or pyrotechnic device triggered by the sensor 49 and causing the pin 47 to be ejected, thereby allowing the elastic return means 46 to fully move the pivotable arm 25 rearward, as shown in FIG. 13b.

Figure 14A:
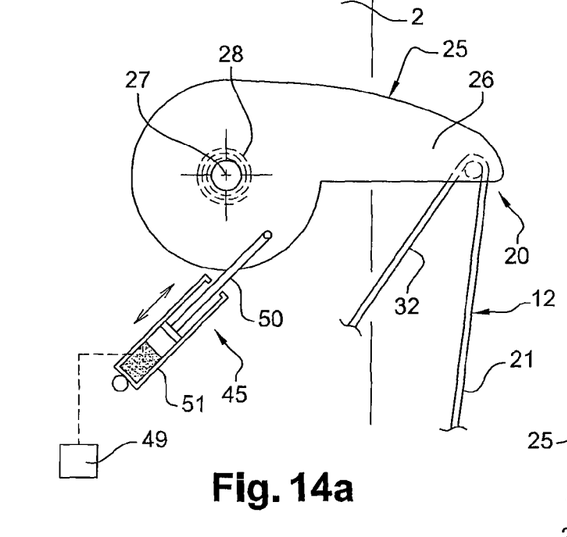
FIGS. 14a and 14b are detailed views of a pivotable arm of a seat belt arrangement, provided with means allowing said arm to be collapsible, according to a second embodiment, respectively during normal use and after a strong deceleration of the vehicle.
Figure 14B:
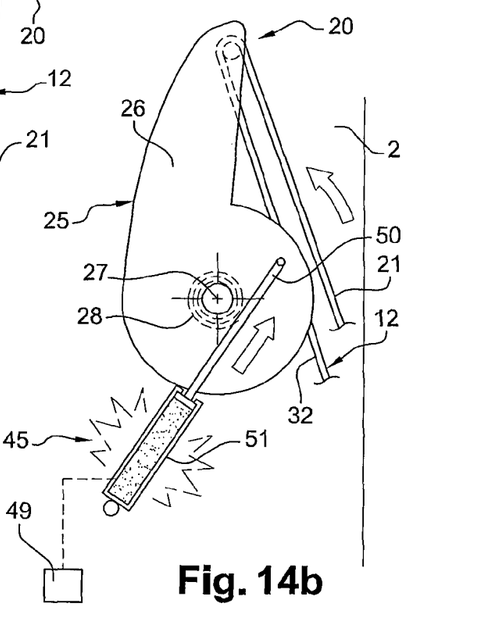

According to a second embodiment, depicted in FIGS. 14a and 14b, the safety actuator 45 is distinct from the elastic return means which are used to urge the pivotable arm 25 towards the neutral position, namely the previously mentioned torsion spring 28.

The safety actuator 45 is designed not to hinder the normal operation of the elastic return means 28. However, following a deceleration or a shock exceeding a predetermined level, the safety actuator 45 causes the pivotable arm 25 to pivot despite or in addition to the elastic return means 28.

In practice, the safety actuator 45 can include a rod 50 capable of sliding in a housing 51, and connected to the pivotable arm 25. In normal operation, the rod 50 can freely slide in the housing 51. In case of a shock being detected by the sensor 49, the safety actuator 45 is activated, for example by a pyrotechnic device or by an electromagnetic device located inside the housing 51, thereby causing a sudden movement of the rod 50 leading to quickly move the pivotable arm 25 rearward, as shown in FIG. 4b.

The invention therefore provides a seat belt arrangement that is particularly advantageous from several points of view, including:
  simplicity of the seat structure, which can have a considerably lighter design;
  as well as safety and comfort for the seat occupant, because he is more inclined, to buckle up since the seat belt is easier to grab and avoid discomfort in normal use (especially when the vehicle is in motion).

The invention is of course not limited to the embodiments described above as examples, but encompasses all technical equivalents and alternatives of the means described as well as combinations thereof.

The invention claimed is:

1. A seat belt arrangement for a suspension seat installed in a vehicle, the suspension seat being capable of moving vertically relative to the vehicle frame in response to the vehicle movements, the seat belt arrangement comprising:
  a seat belt having a first end portion intended to be secured to the seat at a first lower attachment point, and a second end portion mounted on a reel intended to be secured to the vehicle frame;
  a lower deflection member slidably attached to the seat belt between the first end portion and the second end portion and equipped with a locking element intended to be removably locked in a second lower attachment point on the seat such that, when the lower deflection member is locked in the second lower attachment point, the direction of the seat belt is modified by the lower deflection member;

an upper deflection system to deviate the seat belt between the lower deflection member and the reek and in or on which the seat belt may slide; and a pivotable arm in or on which the upper deflection system is arranged and which is intended to be mounted on the vehicle frame so as to be able to automatically pivot about a pivot axis relative to the vehicle frame when the seat moves vertically, in order to keep the length of the torso portion of the seat belt, between the upper deflection system and the lower deflection member, substantially constant.

2. The seat belt arrangement according to claim 1, comprising elastic return means arranged to urge the pivotable arm towards a predetermined neutral position, the return force of the elastic return means being set to compensate the pulling force exerted on the pivotable arm when the seat moves vertically, in order to keep the length of the torso portion of the seat belt and the seat belt tension substantially constant.

3. The seat belt arrangement according to claim 2, wherein the pivotable arm is designed to be collapsible towards a security configuration, in which its front end has moved at least one of rearward and upward, in case the vehicle is subjected to a shock or to a deceleration exceeding a predetermined level, the seat belt arrangement comprising a safety actuator coupled to a sensor capable of detecting a strong deceleration of the vehicle or capable of detecting a shock on the vehicle, the safety actuator being capable of quickly pivoting the pivotable arm, and wherein the safety actuator is distinct from the elastic return means, the safety actuator being designed not to hinder the normal operation of the elastic return means and, following a shock or a deceleration exceeding a predetermined level, to cause the pivotable arm to pivot despite or in addition to the elastic return means.

4. The seat belt arrangement according to claim 1, wherein the upper deflection system is arranged on a front end of the pivotable arm, the pivot axis being offset rearward from the upper deflection system, in the mounted position.

5. The seat belt arrangement according to claim 1, wherein the pivotable arm comprises braking means capable of restraining or blocking the movement of the seat belt relative to the upper deflection system when the seat moves vertically.

6. The seat belt arrangement according, to claim 5, wherein the braking means comprise friction means designed to cooperate with the seat belt so as to substantially prevent the seat belt from sliding relative to the upper deflection system in normal operation and when the seat is moving vertically, and to allow the seat belt to slide relative to the upper deflection system following a manual traction by a user.

7. The seat belt arrangement according to claim 6, wherein the friction means are arranged on the upper deflection system.

8. The seat belt arrangement according to claim 6, wherein the friction means comprise an anti slip surface, including an anti slip material and/or relief patterns.

9. The seat belt arrangement according to claim 6, wherein the upper deflection system is fixed with respect to a body of the pivotable arm and comprises a bearing surface for the seat belt which is at least partially substantially cylindrical in shape, the friction means being arranged on the bearing surface.

10. The seat belt arrangement according to claim 6, wherein the upper deflection system comprises at least one roll rotatably mounted on a body of the pivotable arm and having friction means arranged on its outer surface, the braking means being arranged to hinder the free rotation of the roll with respect to the pivotable arm body.

11. The seat belt arrangement according to claim 5, wherein the braking means comprise at least one movable member which can move with respect to a body of the pivotable arm between a blocking position, in which the seat belt cannot slide relative to the upper deflection system in normal operation, and a release position, in which the seat belt can slide relative to the upper deflection system.

12. The seat belt arrangement according to claim 11, comprising a spring member designed to stress the movable member towards its release position, the movable member being able to be moved towards the blocking position, against the spring force, by the seat belt in normal operation.

13. The seat belt arrangement according to claim 11, comprising a spring member designed to stress the movable member towards its blocking position, the movable member being able to be moved towards the release position, against the spring force, through a manual action of a user pulling on the seat belt.

14. The seat belt arrangement according to claim 5, wherein the upper deflection system comprises a plurality of rolls capable of forming a winding path for the seat belt, thereby braking the movement of the seat belt relative the upper deflection system.

15. The seat belt arrangement according to claim 14, wherein at least one roll is movable relative to the other roll(s) between a first position in which the path is designed to generate a first level of friction, and a second position, in which the roll is located farther from the other roll(s), so that the path is less winding and generates a second level of friction which is lower than the first one.

16. The seat belt arrangement according to claim 1, wherein substantially the whole bearing surface is covered with an anti slip surface.

17. The seat belt arrangement according to claim 1, wherein the bearing surface includes a retractable flap which is maintained substantially level with the remaining portion of the bearing surface in normal operation and which protrudes outward when a user pulls on the seat belt.

18. The seat belt arrangement according to claim 17, wherein an anti slip surface covers at least part of the retractable flap and/or at least part, of the remaining portion of the bearing surface.

19. The seat belt arrangement according to claim 1, wherein the pivotable arm is designed to be collapsible towards a security configuration, in which its front end has moved at least one of rearward and upward, in case the vehicle is subjected to a shock or to a deceleration exceeding a predetermined level.

20. The seat belt arrangement according to claim 19, comprising a safety actuator coupled to a sensor capable of detecting a strong deceleration of the vehicle or capable of detecting a shock on the vehicle, the safety actuator being capable of quickly pivoting the pivotable arm.

21. The seat belt arrangement according to claim 20, wherein the safety actuator includes:

elastic return means arranged to urge the pivotable arm towards a predetermined neutral position;

a retaining element which cooperates with the elastic return means in normal operation in order to prevent them from stressing the pivotable arm beyond the neutral position;

a deactivating element capable of deactivating the retaining element so that the elastic return means can move the pivotable arm beyond the neutral position towards the security configuration.

22. A vehicle comprising:

a frame;

a suspension seat installed so as to be capable of moving vertically relative to the vehicle frame in response to the vehicle movements, the suspension seat including a first and a second lower attachment points;

and a seat belt arrangement for a suspension seat installed in a vehicle, the suspension seat being capable of moving vertically relative to the vehicle frame in response to the vehicle movements, the seat belt arrangement comprising a seat belt having a first end portion intended to be secured to the seat at a first lower attachment point, and a second end portion mounted on a reel intended to be secured to the vehicle frame, a lower deflection member slidably attached to the seat belt between the first end portion and the second end portion and equipped with a locking element intended to be removably locked in a second lower attachment point on the seat such that, when the lower deflection member is locked in the second lower attachment point, the direction of the seat belt is modified by the lower deflection member, an upper deflection system to deviate the seat belt between the lower deflection member and the reel, and in or on which the seat belt may slide, and a pivotable arm in or on which the upper deflection system is arranged and which is intended to be mounted on the vehicle frame so as to be able to automatically pivot about a pivot axis relative to the vehicle frame when the seat moves vertically, in order to keep the length of the torso portion of the seat belt, between the upper deflection system and the lower deflection member, substantially constant, and the seat belt first end portion being secured to the seat at the first lower attachment point, the reel on which the seat belt second end is mounted being secured to the vehicle frame, and the pivotable arm being, pivotably mounted on the vehicle frame about a pivot axis.

23. The vehicle according to claim 22, wherein the pivot axis is substantially transversal to the vehicle and offset rearward from the upper deflection system.

24. The vehicle according to claim 22, wherein the upper deflection system is located forward from the seat backrest.

25. The vehicle according to claim 22, wherein the pivot axis position the vehicle can be adjusted at least one of longitudinally and vertically.

26. The vehicle according to claim 22, wherein the pivot axis is arranged on the vehicle B-pillar.

* * * * *